US005609348A

United States Patent [19]
Galumbeck

[11] Patent Number: 5,609,348
[45] Date of Patent: Mar. 11, 1997

[54] WHEELCHAIR

[75] Inventor: Michael H. Galumbeck, Columbia, Md.

[73] Assignee: ReGain, Inc., Columbia, Md.

[21] Appl. No.: 410,897

[22] Filed: Mar. 27, 1995

Related U.S. Application Data

[63] Continuation-in-part of Ser. No. 969,066, Oct. 30, 1992, Pat. No. 5,401,044, which is a continuation-in-part of Ser. No. 741,589, Aug. 7, 1991, Pat. No. 5,211,414, which is a continuation-in-part of Ser. No. 527,295, May 23, 1990, abandoned.

[51] Int. Cl.⁶ ............................. B62M 1/14; A47C 7/50
[52] U.S. Cl. ..................... 280/250.1; 280/304.1; 297/423.19
[58] Field of Search ................... 280/250.1, 242.1, 280/249, 250, 304.1; 180/907; 297/DIG. 4, 423.19, 423.21, 423.25

[56] References Cited

U.S. PATENT DOCUMENTS

| | | |
|---|---|---|
| 287,789 | 11/1883 | Arbogast . |
| 2,181,420 | 10/1937 | Everest et al. . |
| 3,337,261 | 10/1965 | Nihlean et al. . |
| 4,231,614 | 11/1980 | Shaffer . |
| 4,249,774 | 2/1981 | Andreasson ................ 297/311 |
| 4,380,343 | 4/1983 | Lovell et al. . |
| 4,598,944 | 7/1986 | Meyer et al. . |
| 4,625,984 | 12/1986 | Kitrell . |
| 4,732,402 | 3/1988 | Lambert . |
| 4,758,013 | 7/1988 | Agrillo . |
| 4,809,804 | 3/1989 | Houston et al. . |
| 5,513,867 | 5/1996 | Bloswick et al. ............ 280/250.1 |

FOREIGN PATENT DOCUMENTS

| | | |
|---|---|---|
| 2492657 | 4/1982 | France . |
| 776610 | 11/1980 | U.S.S.R. . |
| WO8201314 | 4/1982 | WIPO . |

Primary Examiner—Paul N. Dickson
Attorney, Agent, or Firm—Sixbey, Friedman, Leedom & Ferguson

[57] ABSTRACT

The wheelchair of the present invention permits a patient to manually rotate handwheels which operate a drive mechanism to selectively propel the wheelchair, raise and lower the wheelchair seat between a standing and a sitting position or raise the footrest for the wheelchair to elevate a patient onto a portion of a wheelchair support seat in the standing position. As the seat moves to a raised position, a front section thereof pivots downwardly relative to a rear section and the rear section is contoured to support the buttocks of a patient.

15 Claims, 10 Drawing Sheets

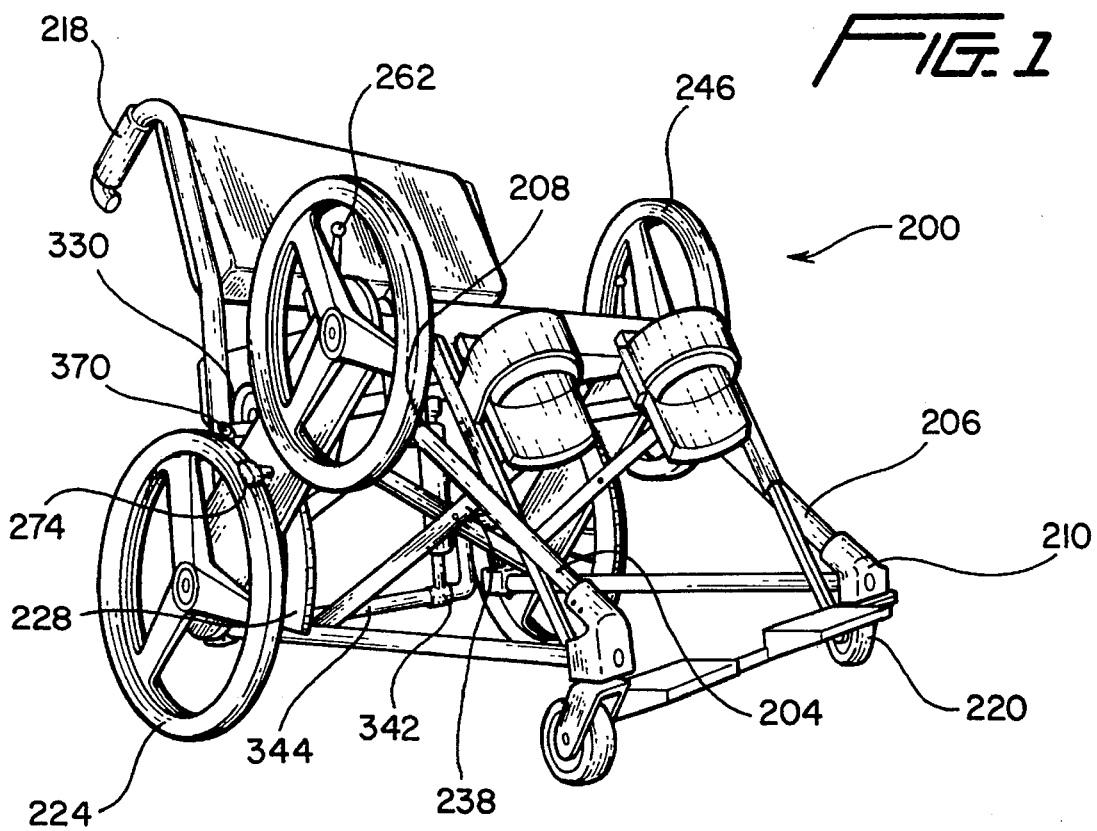
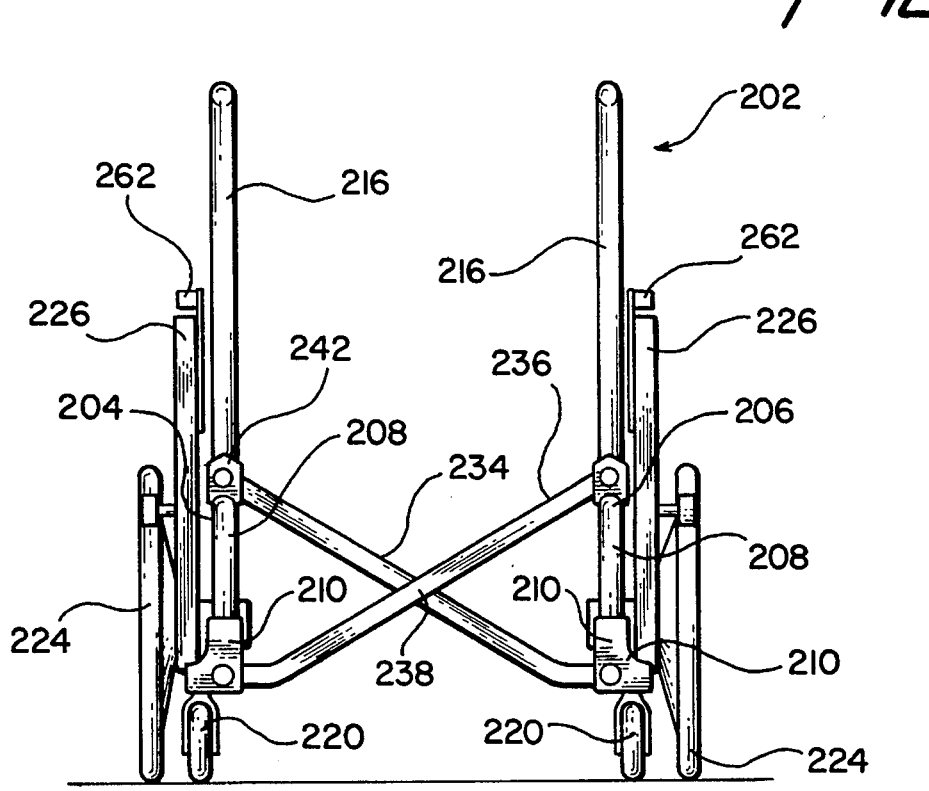

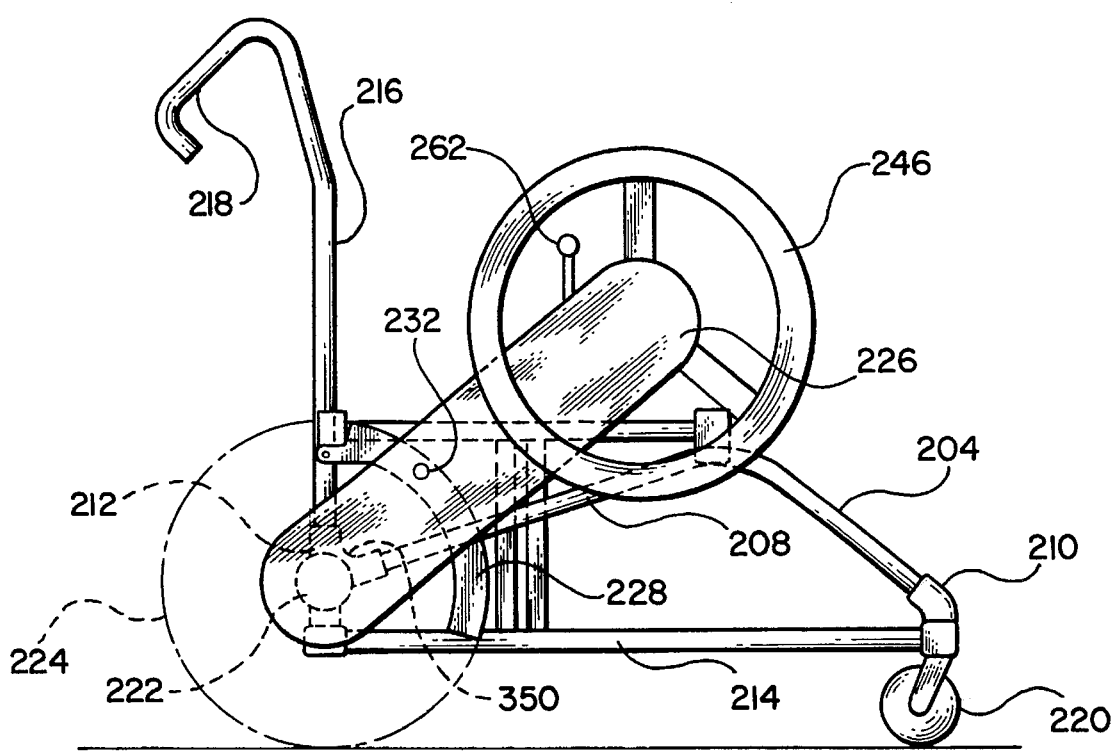
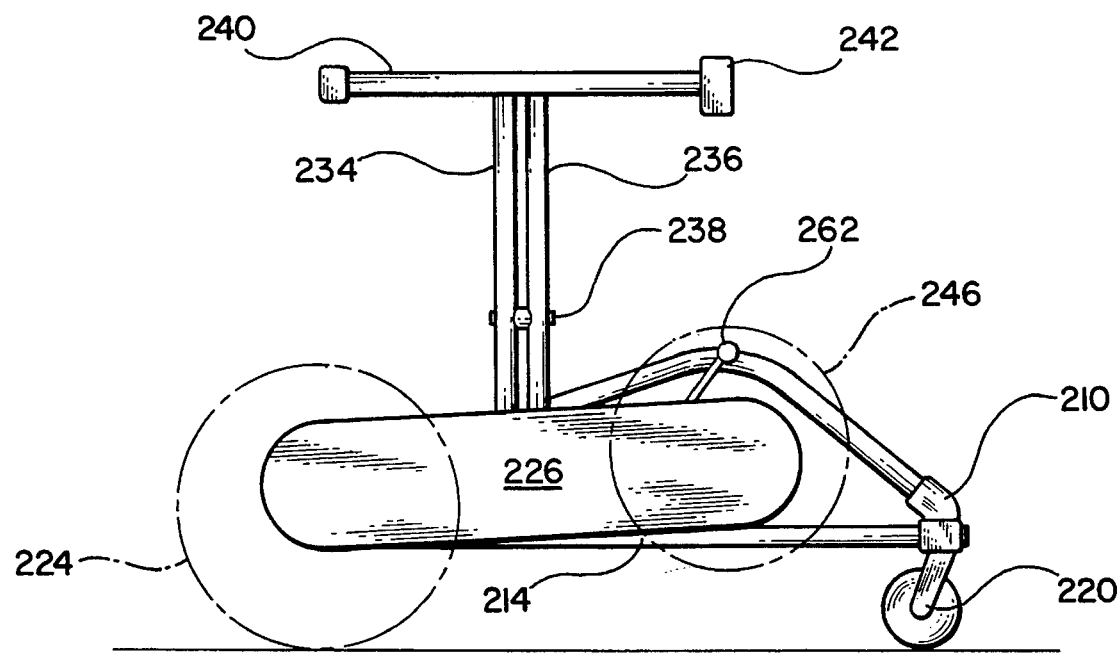

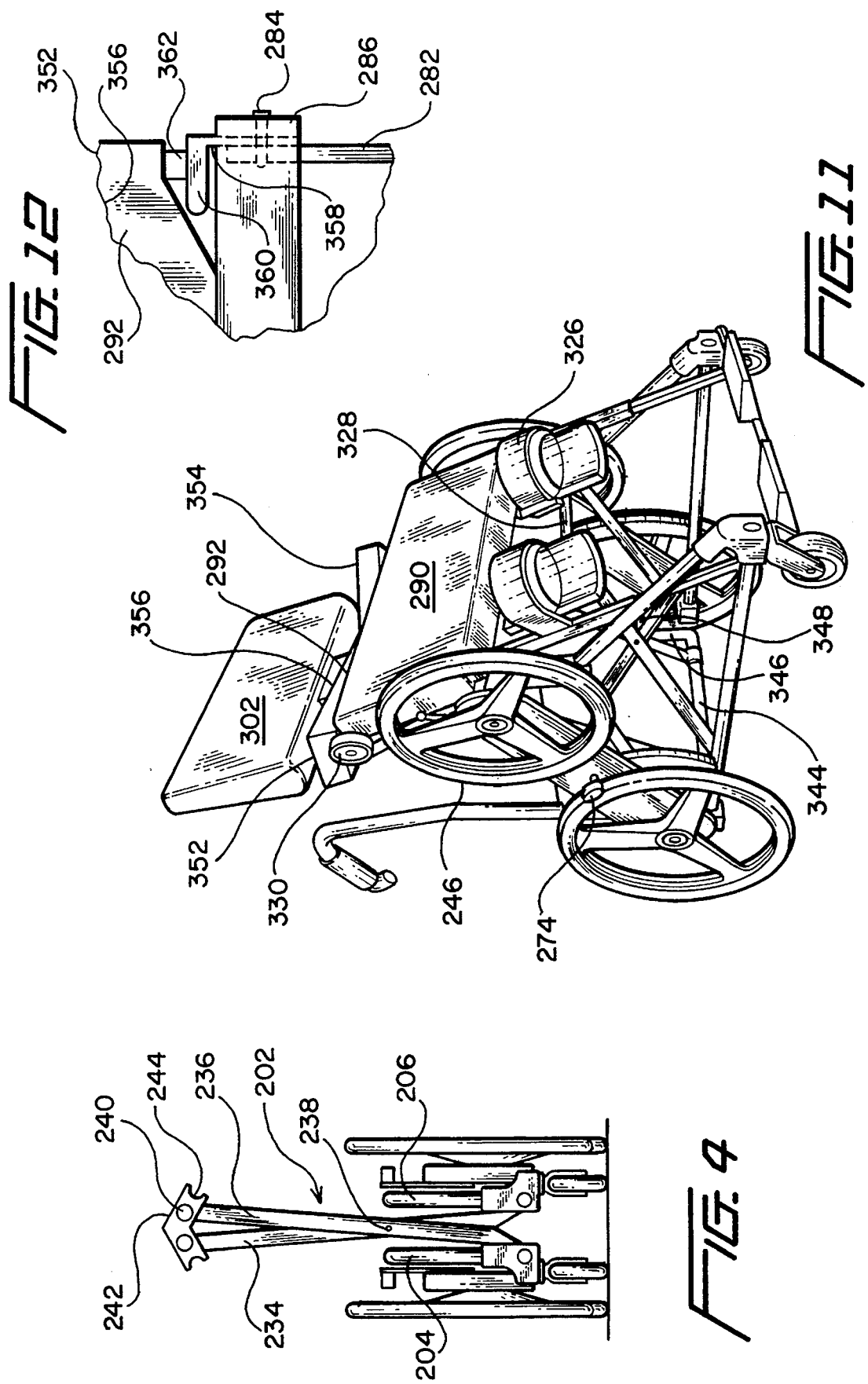

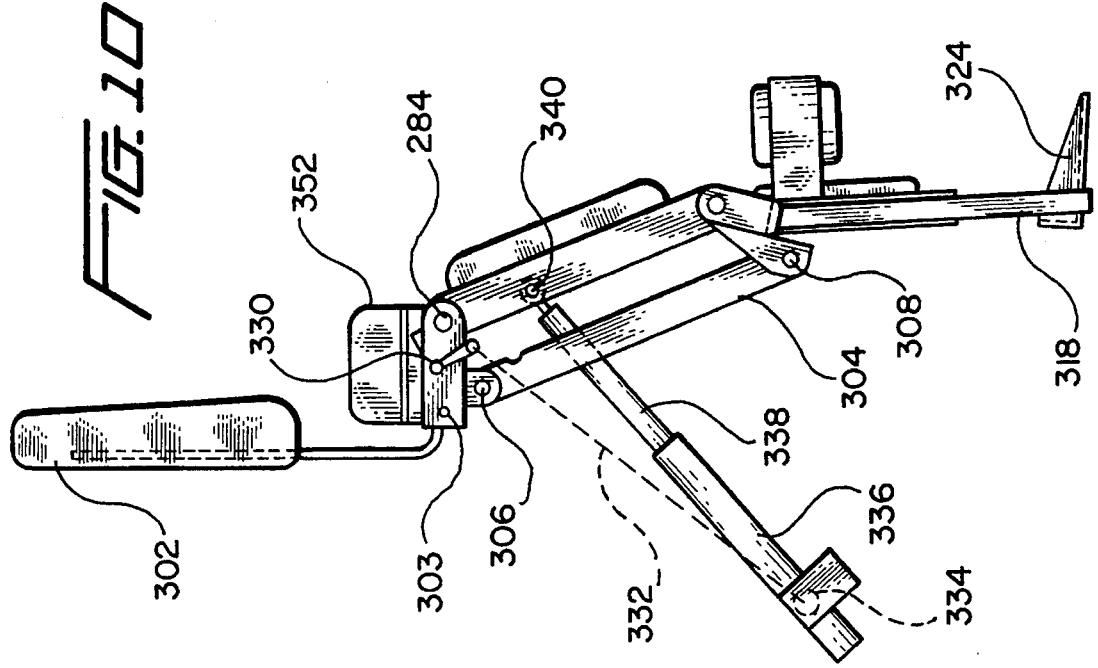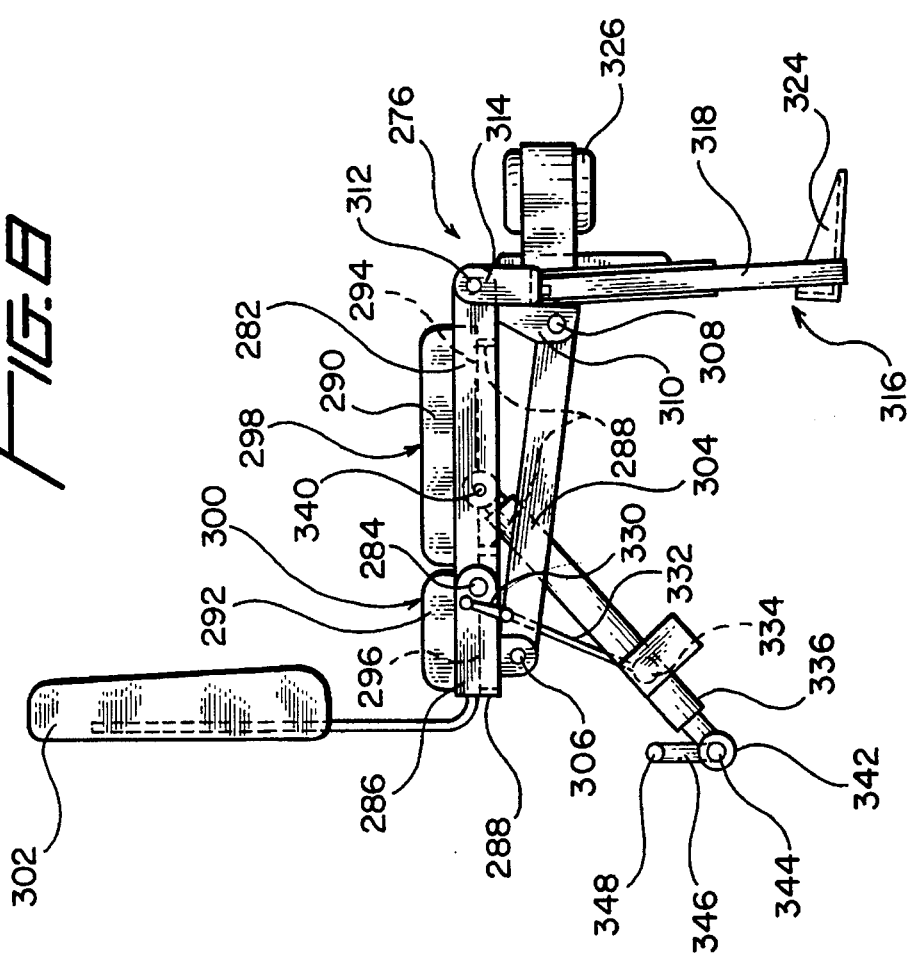

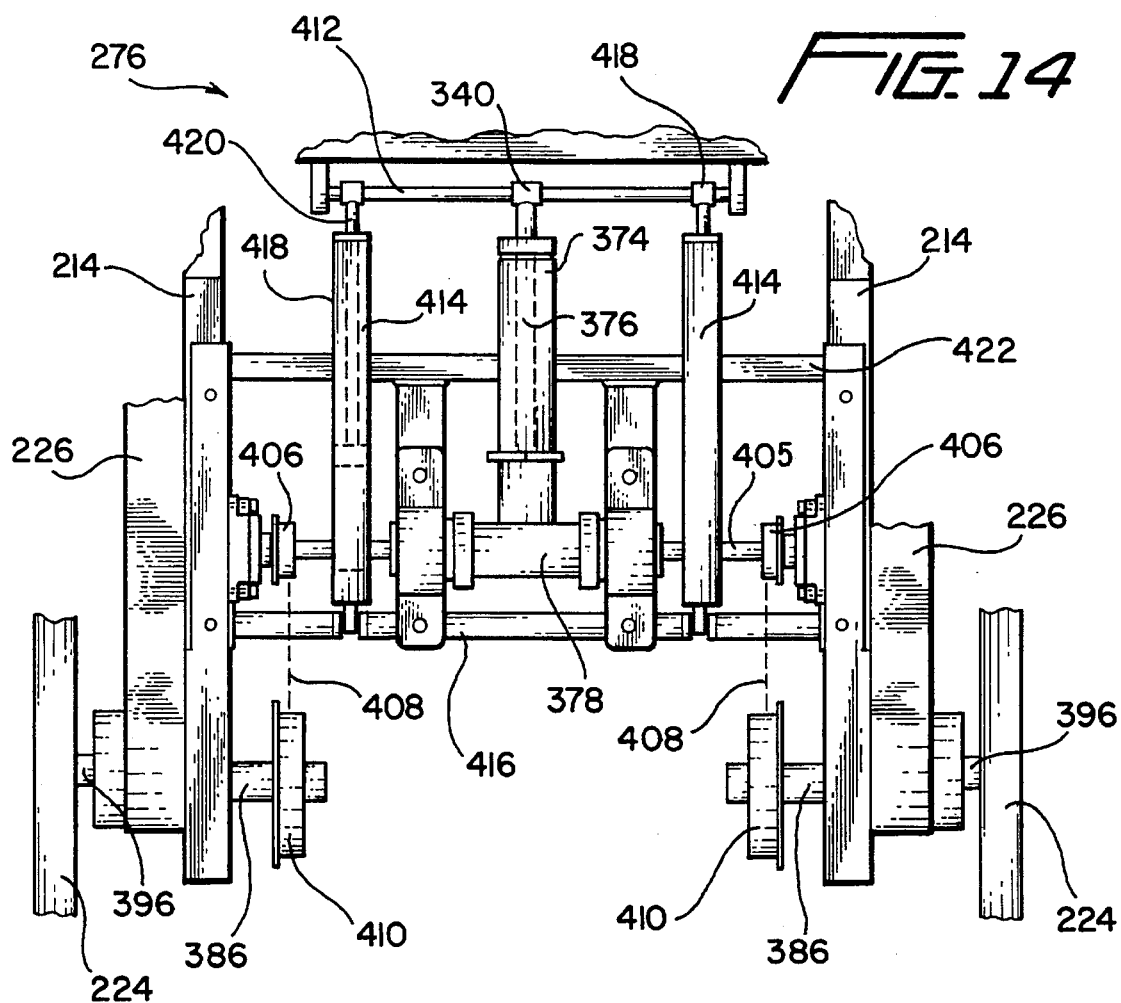
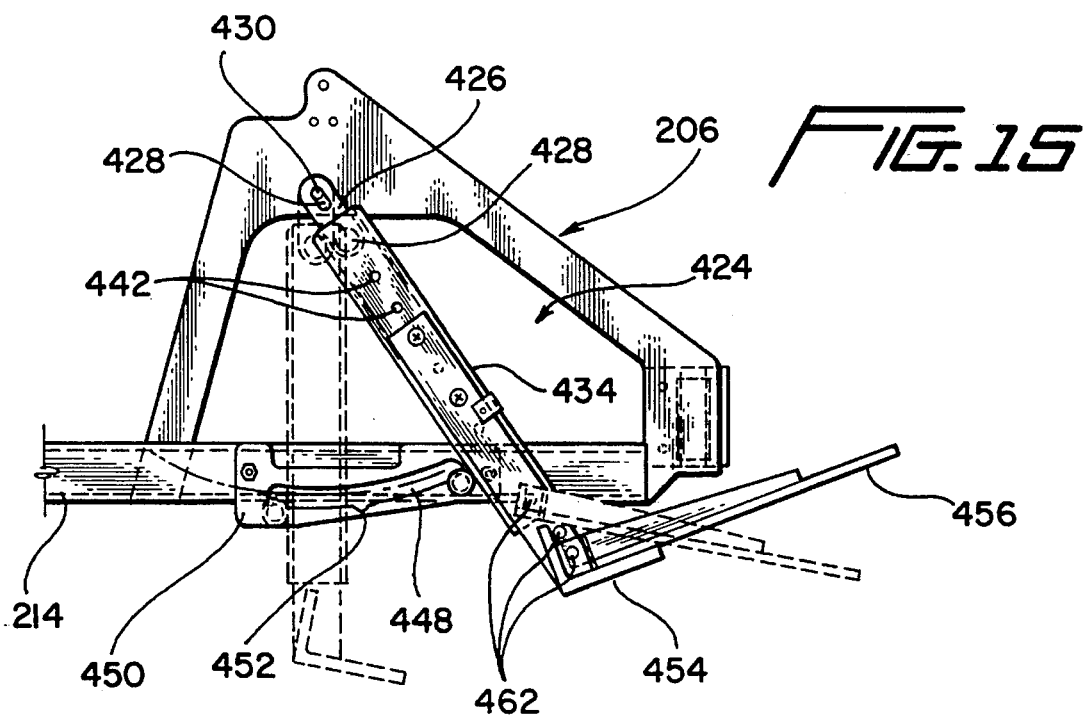

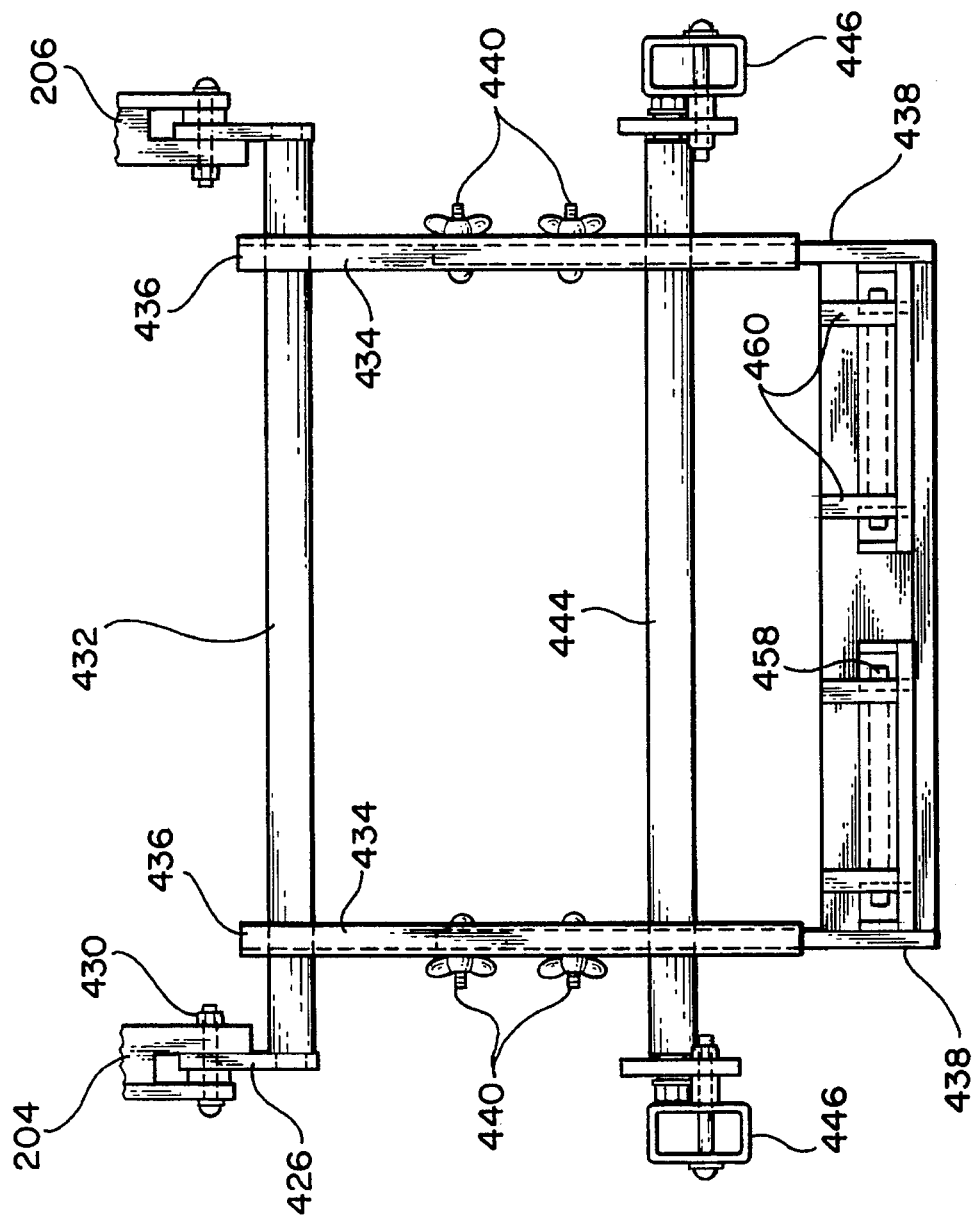

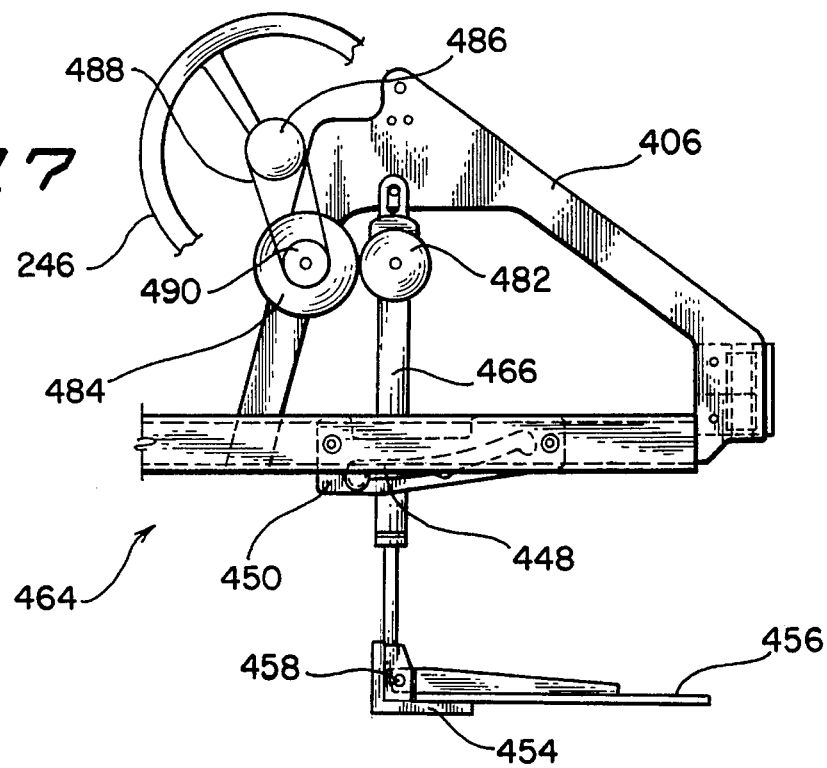

WHEELCHAIR

This application is a continuation-in-part of U.S. Ser. No. 07/969,066 filed Oct. 30, 1992, now U.S. Pat. No. 5,401,044, which is a continuation-in-part of U.S. Ser. No. 07/741,589 filed Aug. 7, 1991, now U.S. Pat. No. 5,211,414, which was a continuation-in-part of U.S. Ser. No. 07/527,295 filed May 23, 1990, noe abandoned.

TECHNICAL FIELD

The present invention relates generally to wheelchairs and specifically to a wheelchair designed to support an occupant in both a sitting and standing position.

BACKGROUND OF THE INVENTION

Disabled persons who are confined to wheelchairs have often found their mobility and, hence, their activities limited by the capabilities of the wheelchairs available to them. The efforts of architects and planners to make public places and private spaces accessible to the wheelchair-bound can be thwarted by the limitations of the very wheelchairs on which the handicapped must depend for access to all parts of their environment. Currently, available wheelchairs include those that are motor driven and those that are driven manually. The high cost of motor driven wheelchairs, which are powerful enough to negotiate many different types of surfaces and terrains, puts them beyond the reach of large numbers of those who need them. The available manually driven wheelchairs, moreover, are often difficult to drive, especially up inclines, over curbs and on uneven terrain. In addition, the majority of these wheelchairs restrict the user to a sitting position. Those wheelchairs that enable their users to assume a standing position are expensive, complex and uncomfortable.

The design of currently available manually driven wheelchairs, moreover, presents many disadvantages and limitations. Two large drive wheels, which are usually positioned on each side near the center of gravity of the wheelchair, support the wheelchair and contact the ground, floor or other base surface on which the wheelchair rests. These large wheels are moved by the user's hands to propel the wheelchair in the direction desired. This is difficult for many infirm wheelchair occupants, as the large wheels on most wheelchairs are located at the rear of the chair, and the occupant must reach back to grasp and propel the wheel. This requires an upper body strength that many handicapped and infirm persons do not have.

Additionally, because the user must usually contact the large drive wheels directly to propel the wheelchair, the user's hands and clothing tend to become soiled during travel, particularly during inclement weather and during travel over surfaces covered with dirt, oil, or other foreign matter which can be picked up by the wheelchair wheels.

To avoid the problems presented by dirt and foreign matter carded by the wheels of a wheelchair, handwheels have been provided which do not contact the wheelchair support surface but which are linked to the wheelchair wheels by a propulsion linkage system. U.S. Pat. Nos. 2,181,420 to Everest et al, 4,380,343 to Lovell et al and 4,625,984 to Kitrell disclose wheelchairs driven by hand wheels which are manually rotated by the wheelchair occupant to drive ground contacting wheels and propel the chair. However, the practice has been to position these handwheels toward the center or rear of the chair, thereby requiring the wheelchair occupant to reach back to grasp the leading edge of the handwheel.

It has been found that less upper body strength is required to propel a wheelchair if the occupant is reaching forward from a sitting position and is propelling the wheelchair by moving the arms from a partially to a fully extended forward position. In an attempt to take advantage of this fact, wheelchairs have been developed with manual drives positioned forwardly of the wheelchair seat. U.S. Pat. Nos. 287,789 to Arbogast and 4,758,013 to Agrrillo are illustrative of powered wheelchairs of this type, but it will be noted that these forwardly positioned wheelchair drives are dual crank drives. Dual crank drives make it difficult for a wheelchair occupant to synchronize the cranking power provided to opposite cranks and require power to be provided by a rotary motion of the arms rather than by the pushing motion used to turn a handwheel. This rotary motion is difficult for many infirm persons to achieve for prolonged periods with sufficient energy to propel the wheelchair.

To allow the wheelchair user virtually unlimited mobility, the chair should support the user adequately in a sitting position for travel. The chair should, in addition, permit the user to assume a standing position supported as needed by the wheelchair in a manner that permits the user to use and, thus, strengthen those parts of the body which he or she is capable of using. Wheelchairs that adjust to support the occupant in both a sitting and a standing position are known. For example, the wheelchair disclosed in U.S. Pat. No. 4,809,804 to Houston et al. achieves this objective. However, the seat assembly in this patent is a complex, motor driven apparatus that leaves the occupant in an extremely uncomfortable upright position with only limited mobility.

In moving a wheelchair occupant from a sitting to a standing position, it is critical that both positions provide adequate and comfortable support if the wheelchair is to function efficiently. It is substantially useless to suspend an occupant uncomfortably from a chest strap assembly in a standing position as often occurs if the user of the chair is a paraplegic or a multiple amputee. The chair should be designed to distribute pressure to the back, buttocks and thighs of a user in the standing position. Also, as the chair moves an occupant from a sitting to a standing position, it is often critical that the chair backrest not apply shear stresses to the back of an occupant.

SUMMARY OF THE INVENTION

It is a primary object of the present invention, therefore, to overcome the disadvantages of the prior art and to provide a manually driven wheelchair which affords the user maximum mobility of travel and position without assistance.

It is another object of the present invention to provide a manually driven wheelchair including a dual function drive mechanism which can be manually actuated by the occupant both to drive the wheelchair and to change the position of the occupant from sitting to standing.

It is a further object of the present invention to provide a wheelchair that allows its user to move from a sitting position to a comfortable, fully supported standing position. The wheelchair also includes a manual drive system to assist geriatric patients to enter and leave the chair.

It is yet a further object of the present invention to provide a manually driven wheelchair with a handwheel actuated arrangement that is easily activated to drive the wheelchair in a desired direction of travel.

It is yet another object of the present invention to provide a wheelchair which includes a seat that is driven between two vertical positions by a seat drive mechanism. In the uppermost position, the seat is reconfigured to provide both user support and comfort.

It is a still further object of the present invention to provide a wheelchair having a manual drive mechanism which includes hand wheels positioned adjacent to the forward section of the wheelchair seat and extending for a substantial distance above the seat. The seat is driven upwardly from a first to a second position by manual operation of a manual seat drive mechanism, and in the second position, the sides of the seat are driven upwardly so that the ischials and tailbone of the chair occupant are suspended over an open central pocket. As the seat is driven upwardly, a front section thereof is pivoted downwardly and drawn rearwardly so as not to interfere with the legs of a patient in a standing position.

The aforesaid objects are achieved by providing a lightweight, manually driven wheelchair with a pair of opposed hand wheels connected through a drive gear, a pulley and belt, or a sprocket and chain drive to a pair of opposed, non-pivoted travel wheels which support one end of the wheelchair on the ground or other travel surface. A pair of pivoted, nondriven travel wheels support the opposite end of the wheelchair. A manual drive mechanism is provided to permit a user to drive the wheelchair seat from a user sitting to a standing position. A wheelchair brake must be engaged before the drive mechanism can be activated to drive the seat to the standing position. In the standing position, a front portion of the seat drops away, and a rear portion of the seat reconfigures to provide a comfortable support for the user's buttocks.

Other objects and advantages will be apparent from the following description, claims and drawings.

BRIEF DESCRIPTION OF THE DRAWINGS

FIG. 1 is a perspective view of the wheelchair of the present invention;

FIG. 2 is a view in front elevation of the support frame for the wheelchair of FIG. 1;

FIG. 3 is a view in side elevation of the support frame of FIG. 2;

FIG. 4 is a view in front elevation of the support frame of FIG. 2 in a collapsed configuration;

FIG. 5 is a view in side elevation of the support frame of FIG. 2 in a collapsed configuration;

FIG. 8 is a view in side elevation of the seat assembly for the wheelchair of FIG. 1;

FIG. 10 is a view in side elevation of the seat assembly of FIG. 8 in the raised position;

FIG. 11 is a perspective view of the wheelchair of FIG. 1 with the seat assembly in the raised position;

FIG. 12 is an end view of a portion of the seat assembly of FIG. 10;

FIG. 14 is a partial view showing a second embodiment of a seat drive mechanism for the wheelchair of the present invention;

FIG. 15 is a view in side elevation of a portion of a second embodiment of a wheelchair foot support unit for the wheelchair of the present invention;

FIG. 16 is a view in front elevation of a portion of the wheelchair foot support of FIG. 15;

FIG. 17 is a partial view in side elevation of a third embodiment of the wheelchair foot support unit for the wheelchair of FIG. 14;

FIG. 18 is a view in front elevation of the a wheelchair foot support unit of FIG. 17;

DESCRIPTION OF THE PREFERRED EMBODIMENTS

Figure 6:
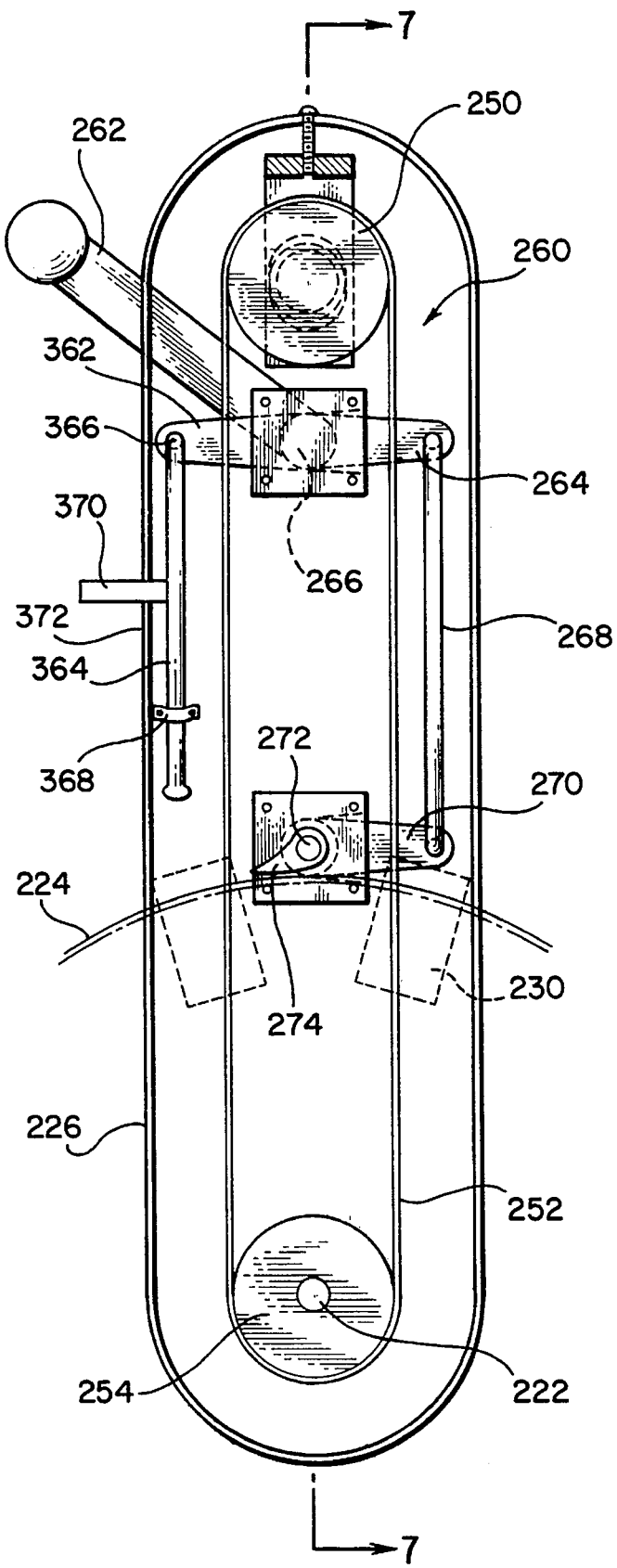
FIG. 6 is a longitudinal sectional view of the drive housing for the wheelchair of FIG. 1.

The wheelchair of the present invention indicated generally at 200 includes a support frame 202 which includes spaced side frames 204 and 206. The side frames are identical structures, and consequently like reference numerals will be used to designate identical units in the two side frames. Each side frame includes a curved side bar 208 having a front end which is secured within a front connector 210 and a rear end which is secured within a rear connector 212. A base bar 214 has front and rear ends which are secured within the front and rear connectors respectively to form unitary side frames 204 and 206. Extending upwardly from each rear connector 212 on opposite sides of the support frame 202 are bars 216, the upper ends of which are curved rearwardly and downwardly to form handles 218.

Pivoted front wheels 220 for the wheelchair 200 are secured within the front connectors 210 and are mounted to swivel relative thereto, while the axles 222 for large, non pivoting drive wheels 224 are mounted for rotation relative to the rear connectors 212 within which they are retained. Each axle extends through a housing 226 which encloses the drive mechanism for one of the drive wheels 224, and this housing, which is positioned between a drive wheel and the adjacent rear connector 212, is capable of pivoting about the axle 222 from an upright position to a lowered position shown in broken lines in FIG. 3. The housing is guided by a curved track 228 connected between the bar 216 and the base bar 214, and includes shoes 230 which receive the track. A spring pressed pin 232 engages a hole (not shown) in the track 228 to lock the housing 226 in the upright solid line position of FIG. 3, and the pin is drawn outwardly to release the housing.

The support frame 202 may be foldable as shown, and is completed by centrally pivoted cross bars 234 and 236 which are pivoted at 238. The lower end of each of the pivoted cross bars is mounted to pivot on one of the base bars 214 and the upper end of each cross bar is secured to an upper side bar 240 which it supports. The end of each upper side bar is secured to a connector 242 which has a curved seat 244 to engage the curved side bar 208 of either the side frame 204 or the side frame 206 when the support frame 202 is expanded as shown in FIG. 2. When the support frame is collapsed as shown in FIGS. 4 and 5, the cross bars pivot about the pivot 238 to raise the upper side bars 240 and permit the side frames 204 and 206 to be brought together. In a nonfoldable frame, the pivot 238 and the pivoted attachment to the base bars 214 would be eliminated and replaced by nonpivotal attachments.

The drive wheels 224 are driven by manually rotatable hand wheels 246 on opposite sides of the wheelchair having axles 248 which extend into and are mounted by the housing 226. Within each housing, the axle 248 is secured to a pulley or sprocket 250, with a pulley being used for a belt drive and a sprocket being used for a chain drive. Rotation of a handwheel will rotate the pulley or sprocket attached to the axle therefor to drive a belt or chain 252 which passes about a lower pulley or sprocket 254. This lower pulley or sprocket is secured to an axle 222 for one of the drive wheels 224. To adjust the tension of the chain or belt, the pulley or sprocket 250 and axle 248 are mounted on a movable mount 256 which is secured to the housing 226 by a threaded bolt 258. This bolt operates to selectively move the mount 256 toward or away from the pulley or sprocket 254 to adjust the belt or chain tension.

A braking mechanism 260 for the wheelchair is mounted within the housing 226 and is controlled by a brake lever 262 extending from the housing. The innermost end of the brake lever is secured to a shaft 266 rotatably mounted on the housing and which is rotated by the brake lever. A link 264 secured to the shaft 266 is pivoted relative to the housing by operation of the brake lever 262. Pivotally connected to the link 264 at one end is a tie red 268, with the opposite end of the tie rod being pivotally connected to a second link 270. The link 270 operates to rotate a shaft 272 and a brake shoe 274 which is connected to the shaft and extends outwardly of the housing 226. When the brake lever 262 is drawn toward the back of the wheelchair or toward the lower pulley 254 in FIG. 6, the link 264 connected thereto moves toward the pulley 250 causing the tie rod 268 to draw the link 270 in the same direction. The link 270 rotates the shaft 272 to rotate the brake shoe 274 downwardly into engagement with an adjacent drive wheel 224. Once the links 264 and 270 pass over center, the brake shoe 274 is locked against the adjacent drive wheel until the brake lever 264 is pushed toward the front of the wheelchair to unlock the brake.

Figure 9:
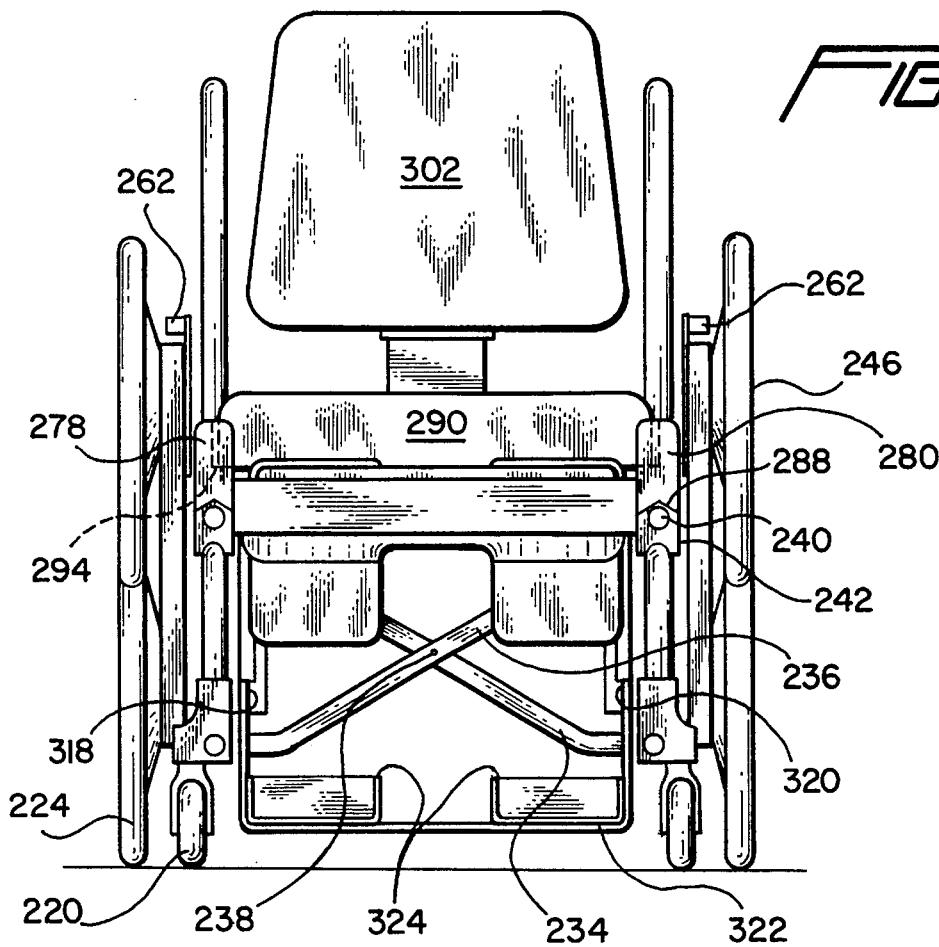
FIG. 9 is a view in front elevation of the wheelchair of FIG. 1.

The wheelchair 200 includes a seat assembly 276 which is snapped onto the foldable support frame 202 but which is separable therefrom. As shown in FIGS. 1 and 8, the seat assembly includes spaced side frame members 278 and 280 which each include a front frame section 282 pivoted at 284 to a rear frame section 286. As illustrated in FIG. 9, the side frame members 278 and 280 have channels 288 extending along the undersides thereof which receive and seat on the upper side bars 240 and connectors 242 of the foldable support frame 202. Connected at either end to the front frame sections 282 and rear frame sections 286 are cross support members 288 which support a front seat cushion 290 and a rear seat cushion 292. The top edges of the front and rear frame sections are formed to provide ledges 294 and 296 respectively (shown in broken lines in FIGS. 8 and 9) to support the outer side edges of the seat cushions 290 and 292, and the cross support members 288 are positioned beneath these ledges.

It will be apparent that the front frame sections 282, front seat cushion 290, and the associated cross support members form a front seat section 298 which may pivot about the pivot 284 relative to rear a seat section 300 formed by the rear frame sections 286, the rear seat cushion 292 and the associated cross support members. A seat back 302 is hingedly connected at 303 to the rear seat section to move from an upright support position as shown in FIG. 8 to a folded position where the seat back is collapsed to rest against the seat cushions 290 and 292.

An elongated support link 304 is pivotally connected at 306 on each side of the seat assembly 276 to one of the rear frame sections 286, and the opposite end of each support link is pivotally connected at 308 to an extension plate 310 which is secured to the front frame section 282. Pivoted at 312 to the front frame section on either side of the wheelchair is a link 314 which is secured to one arm of a "U" shaped footrest 316. This footrest includes side arms 318 and 320 secured to the links 314 and a support section 322 extending between the two side arms. Mounted on the support section are spaced foot support pads 324, and above the foot support pads are leg retainers 326 mounted on a cross bar 328 which extends between the side arms 318 and 320. When the seat assembly 276 is removed from the support frame 202, the seat back 302 can be folded down against the seat cushions 290 and 292 and the footrest 316 can be pivoted about the pivot 312 back against the bottom of the front and rear seat sections to provide a compact unit for transportation or storage.

When the seat assembly 276 is mounted on the support frame 202, it may be raised from an occupant sitting position shown in FIGS. 1, 8 and 9 to an occupant standing position as shown in FIGS. 10 and 11 by the operation of a crank 330 mounted on the rear seat section 300. This crank is connected by a suitable connector 332 to rotate a gear 334 which actuates a pump actuator for a pump, cylinder and piston assembly 336. The pump, cylinder and piston assembly includes a piston 338 which is pivotally secured at 340 to the underside of the front seat section 298 while the opposite end of this assembly is pivotally connected at 342 to a crossbar 344. This crossbar extends across the wheelchair between the side frames 204 and 206, and at each end has an upward extension 346 which terminates at a short laterally extending section 348. The laterally extending sections at either end of the crossbar rest in a seat 350 (FIG. 3) formed by the rear connectors 212.

As will be noted in FIGS. 10 and 11, when the crank 330 is rotated to drive the seat assembly 276 from the lowermost position with the occupant sitting to the uppermost position where the occupant is standing, the seat assembly is driven forwardly and upwardly. As the piston 338 expands, the connector 332, which may be a flexible cable with an inner rotating link to turn the gear 334, causes the gear to rotate to activate a pump actuator contained in the pump, cylinder and piston assembly 336. Gas is pumped into the cylinder and the piston 338 drives the seat assembly upwardly. As the seat assembly rises, the support link 304 also rises and pivots about the pivots 306 and 308, and the rear seat section 300 maintains its relationship with the seat back 302. Thus there are no shear forces applied to the back of a wheelchair occupant by the seat back 302 as there would be if both the rear seat section 300 and front seat section 298 pivoted with relation to the seat back. When the seat assembly rises, the front seat section 298 pivots downwardly about the pivot 284 behind the user's legs, while the rear seat section continues to provide support for the user's buttocks without movement relative to the seat back. It will be noted in FIG. 11 that in the raised position, the seat assembly angles rearwardly from bottom to top at a five to ten degree angle. This causes the user's weight to be forced back against the seat assembly, but the angle is not great enough to interfere with the user's ability to function in the standing position.

If a user operates with the seat assembly 276 in the uppermost position of FIGS. 10 and 11 for extended periods of time, pressure between the rear seat cushion 292 and the tailbone and ischials of the user may result in some discomfort. To relieve this pressure, the side edges 352 and 354 of the rear seat cushion 292 are driven upwardly above the plane of a center portion 356 as the seat assembly rises by a mechanism positioned beneath the side edges, one such mechanism being shown in FIG. 12. This raising of the side edges of the rear cushion 292 causes the cushion to "dish" toward the center portion as indicated at 356 and relive pressure on the tailbone and ischials of a user.

To raise the edges of the rear cushion 292, an arm 358 is secured to each front frame section 282 so as to extend beyond the pivoted end thereof. When the seat assembly is raised and the front frame sections drop down around the pivot 284, the arms 358 pivot up beneath the side edges 352 and 354 of the rear cushion raising them above the center portion 356. A laterally extending projection 360 is formed on the top of each arm and engages a bar 362 which extends beneath the side edge of the rear cushion substantially parallel to the rear frame section 286. The bar 362 may be attached in any suitable manner to the rear seat section so as to facilitate upward movement of the bar when it is engaged by the lateral projection 360. For example, the bar may be pivoted at one end to a cross support member 288, and it is also desirable for this pivoted end to have limited lateral movement in a track secured to the cross support member. This permits the bar to be adjusted laterally along the lateral projection 360 to adjust the curvature of the rear seat cushion 292. Alternatively, the bar 362 could be held in a track attached to the bottom of the rear seat section 300 to permit lateral adjustment of the bar.

Before the seat assembly 276 is raised from the lowermost sitting position to the uppermost standing position, it is beneficial to insure that the wheelchair drive wheels 224 are locked so that the wheelchair will not accidentally begin to roll as the occupant is being raised. A simple method for accomplishing this is to prevent operation of the crank 330 until the drive wheels are locked. As will be noted in FIG. 6, a second link 362 is secured to the shaft 266 to rotate therewith. A rod 364 is pivotally connected at 366 to the link 362 and is mounted to slide in a retainer 368 mounted on the housing 226. Secured to the rod 364 intermediate the pivotally connected end 366 and the retainer 368 is a laterally projecting stop 370. This stop projects through a slot 372 in the top of the housing and will engage and prevent rotation of the crank 330 when the drive wheels 224 are unlocked. When the brake lever 262 is moved toward the pulley 222 to lock the drive wheel, the link 362 moves the rod 364 toward the pulley 222 and the stop 370 moves in the slot 372 out of the path of the crank 330, the crank may now be rotated to raise the seat assembly 276.

Figure 13:
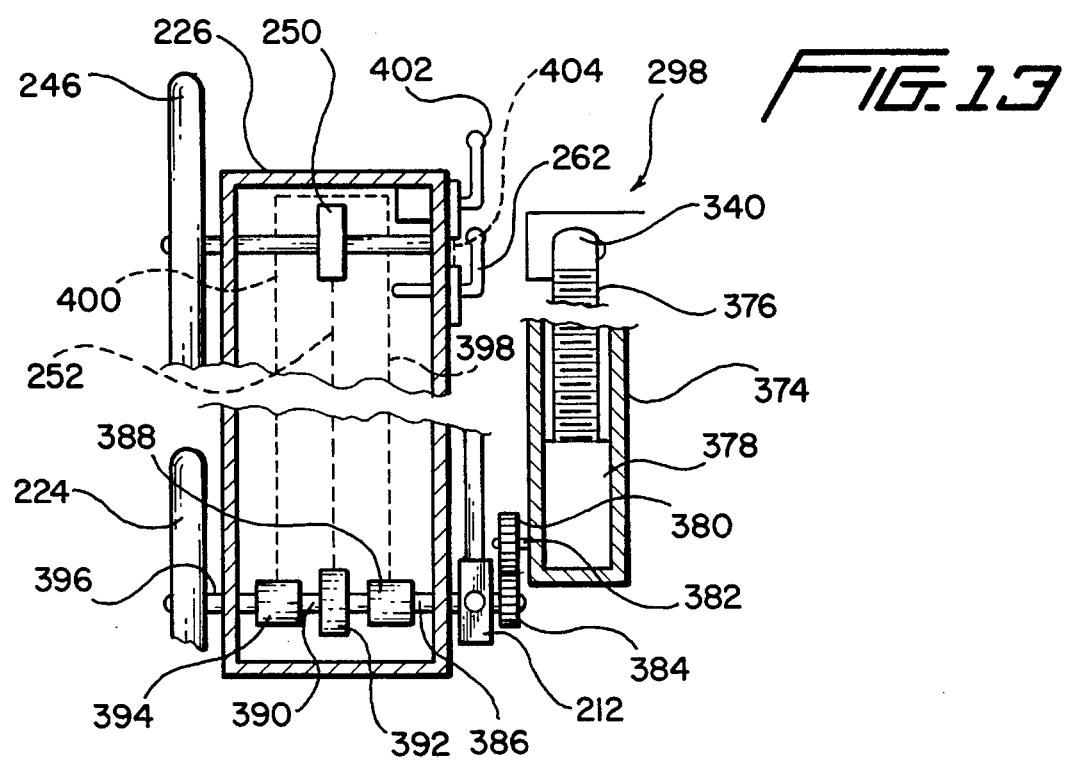
FIG. 13 is a sectional view of a second embodiment of the drive housing and drive mechanism for the wheelchair of FIG. 1.

Referring now to FIG. 13, it will be noted that it is possible to use the handwheels 246 both to drive the wheelchair as well as to raise and lower the seat assembly 276. This is often preferable, as it is easier to apply more power to the dual handwheels than it is to the smaller crank 330.

In FIG. 13, the pump cylinder and piston assembly 336 attached to the front seat section 298 is replaced by a cylinder 374 which contains an elongated threaded screw 376 that is pivotally connected at 340 in the same manner as was the piston 338. The screw 376 is extended and retracted by a mechanism 378 which is driven by a gear 380, and the mechanism 378 contains known transmission gearing for converting the rotation of a shaft 382 driven by the gear 380 to rotation of a restrained threaded member in the mechanism 378 which receives the screw 376. The threaded member operates in response to rotation of the gear in one of two opposite directions to extend or retract the screw.

When the seat assembly 276 is mounted on the support frame 202, the cylinder 374 is supported on the support frame in the same manner as the pump, cylinder and piston assembly 336, although any suitable means for removably supporting the cylinder on the support frame can be employed. With the seat assembly and its attached threaded screw 376 and cylinder 374 in place on the support frame 202, the gear 380 will mesh with a gear 384 which is mounted on a stub shaft 386 extending from the housing 226 through the rear connector 212. The stub shaft 386 is mounted for rotation relative to the rear connector, and within the housing extends outwardly from a clutch 388. This clutch selectively connects and drives the stub shaft 386 from a shaft 390 which drives the clutch by means of a pulley or sprocket 392 secured to the center of the shaft 390. The shaft 390 also drives a second clutch 394 which selectively connects and drives a stub axle 396 for a drive wheel 224.

The clutches 388 and 394 are connected by suitable control linkages 398 and 400 respectively to a clutch control lever 402. When the clutch control lever is moved in one direction; i.e. rearwardly, the linkages 398 and 400 operate so that the clutch 394 engages and the clutch 388 disengages. Now rotation of the handwheel 246 and the pulley or sprocket 250 drives the belt or chain 252 which operates to drive the pulley or sprocket 392. The drive wheel 224 will be driven, as the clutch 394 is engaged, but the stub shaft 386 and gear 384 will not be driven as the clutch 388 is disengaged.

Conversely, when the clutch control lever 402 is moved in the opposite direction; i.e. forwardly, the linkages 398 and 400 cause the clutch 394 to disengage and the clutch 388 to engage. Now rotation of the handwheel 246 will not drive the drive wheel 224, but instead will drive the stub shaft 386 and gear 384 to cause rotation of the gear 380 and thus extension or retraction of the threaded screw 376. This in turn will raise or lower the seat assembly in the manner illustrated in FIGS. 10 and 11.

Figure 7:
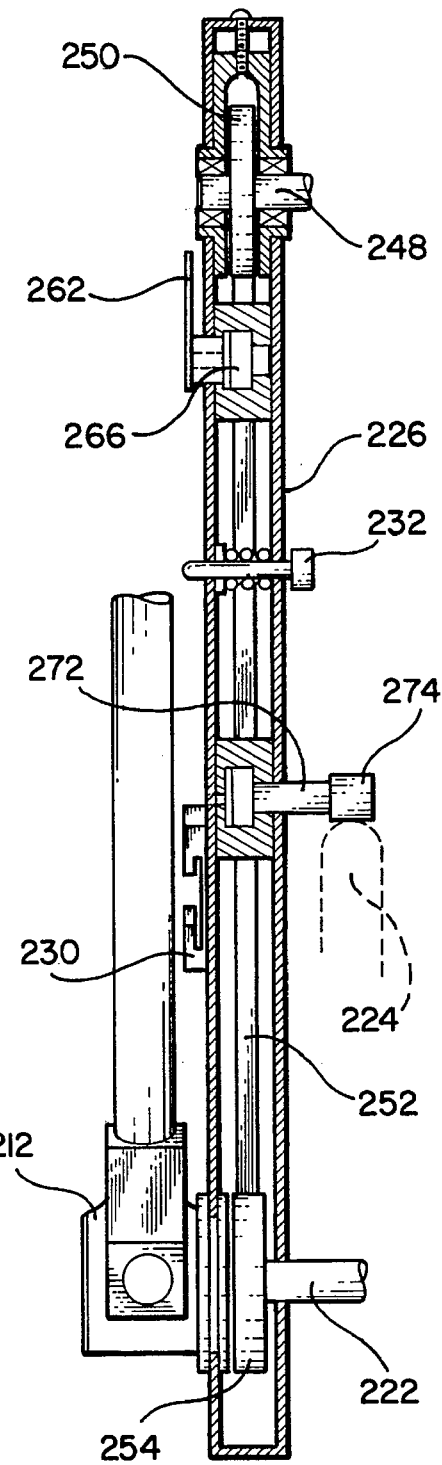
FIG. 7 is a sectional view taken along lines A—A of FIG. 6.

When the clutch 394 is disengaged and the clutch 388 is engaged, it is desirable to insure that the drive wheel 224 is locked by the brake mechanism of FIGS. 6 and 7 operated by the brake lever 262. This can be accomplished by any suitable linkage indicated at 404 between the brake lever and the clutch control lever 402 which will prevent the clutch control lever from engaging the clutch 388 until the brake is set. For example, this linkage could be a cam or stop which would permit movement of the clutch control lever to engage the clutch 394 regardless of the position of the brake lever 262, but which would block movement of the clutch control lever 402 to engage the clutch 388 until the brake lever is moved to a position where the brake locks the drive wheel 224.

Referring to FIG. 14, a modification of the screw operated seat drive mechanism of FIG. 13 is illustrated. Here, a rotatable drive shaft 405 extends between and is journaled bar rotation on the base bar portions 214 of the support frame 202. Drive pulleys 406 are secured to the drive shaft 405 and operate to rotate the drive shaft when the drive pulleys are rotated by belts 408 connected to pulleys 410. Each of the pulleys 410 is mounted upon a stub shaft 386 extending from a housing 226, and each stub shaft is driven from one of the handwheels 246 in the manner indicated relative to FIG. 13. The clutches 394 and 388 shown in FIG. 13 determine whether or not the handwheels drive the stub shafts 386 or the stub shafts 396. Obviously, the pulleys 406 and 410 can be replaced by sprockets, and in this instance, the belts 408 would then be replaced by drive chains, or suitable gears may be used in the seat drive system.

Rotation of the drive shaft 405 is transmitted by the transmission mechanism 378 which converts the rotation of the drive shaft to rotation of the drive screw 376 to raise or lower the seat assembly 276. A cross bar 412 is provided across the bottom of the seat assembly, and the threaded drive screw 376 is pivotally connected at 340 to this crossbar.

To aid the threaded drive screw 376 in raising and lowering the seat assembly 276, two spring members 414 are mounted on opposite sides of the threaded screw. The lower ends of the spring members are secured to a cross beam 416 which extends between the base bars 214, and the upper ends of the spring members are pivotally attached at 418 to the cross bar 412. Each spring member 414 includes an outer cylinder 418 which houses a piston 420. With the seat assembly in the lowermost position as shown in FIG. 14, a spring or a gas within the cylinder 418 is compressed by the piston 420. As the threaded screw 376 moves outwardly from the cylinder 374 to drive the seat assembly upwardly, the gas or spring within the cylinder 418 forces the piston 220 outwardly to aid in raising the seat assembly.

Referring now to FIG. 15, the support frame 202 for the wheelchair 200 can be modified to provide a rigid noncollapsible frame with cross beams such as those shown at 416 and 422 in FIG. 14 extending between the base bars 214 to separate the spaced side frames 204 and 206 of the support frame. With this structure, an improved foot rest assembly 424 is pivotally mounted between the side frames 204 and 206, one of which is shown in FIG. 15. This foot assembly includes a slotted bracket 426 having a slot 428 which receives a bolt 430 that extends through the slide frame 206. The bracket supports a cross bar 432 to which are secured two spaced support arms 434. Each of the support arms includes an upper section 436 secured to the cross bar 432 and a lower section 438 which is secured to the upper section by bolts 440. The upper and lower sections of the support arms 434 include a plurality of vertically spaced holes 442 which may be aligned to receive the bolts 440 and which permit adjustment of the length of the support arms 434.

Secured to the support arms 434 and spaced from the cross bar 432 is a second cross bar 444 which extends outwardly beyond the support arms. The outer ends of the cross bar 444 support rollers 446 which ride in a curved groove or slot 448 formed in a guide bracket 450 which is secured to each base bar 214. The curved groove 448 controls the extent of pivotal movement of the support arms 434 and cross bar 432 about the bolts 430. Suitable notches or detents 452 may be formed in the bottom surface of the curved groove or slot 448 to vary the angular position of the support arms 434. The slot 428 and the bracket 426 permits the rollers 446 to drop into notches 452 at various positions between the terminal ends of the curved groove or slot 448.

Secured to the lower sections 438 of the support arms 434 and extending between the support arms are rigid L shaped support members 454 which support pivoted elongate foot pads 456. Each foot pad is pivotally secured by a pin 458 to spaced brackets 460 which are mounted on the L shaped support members 454. The spaced brackets 460 include a plurality of vertically spaced holes 462 to receive the pins 458. As will be noted from the broken lines in FIG. 15, the relative angle of the foot pads can be altered by positioning the pins 458 in different selected holes 462. This ability to change the angle of the foot pads 456 is extremely important for the comfort of patients having leg contortions. The angle of the foot pads can be adjusted to provide maximum comfort to the legs of a patient. When the foot pads are not in use, they can be pivoted upwardly about the pins 458 until they rest against the cross bar 444.

For many geriatric patients, it is extremely difficult for the patient to move without assistance from a standing to a sitting position within a wheelchair. Referring to FIGS. 17 and 18, the foot rest assembly 424 of FIGS. 15 and 16 can be modified to assist a geriatric patient in entering the wheelchair when the seat assembly has been raised to the upright or standing position of FIG. 10. This modified foot rest assembly indicated at 464 in FIGS. 17 and 18 replaces the support arms 434 with piston type spring units 466 which are identical to the spring members 414 previously described. The upper piston ends of each of the spring members is attached to the cross bar 432 while the lower ends of the cylinders for the spring members are connected to support sections 468 which are similar to the lower support sections 438 in FIG. 16.

A threaded drive screw 470 mounted in a cylinder 472 is connected at 474 to a bar 476 which extends between the L shaped support members 454. This drive screw construction is identical to that shown at 374 and 376 in FIG. 14, and the drive screw is operated by a transmission mechanism 478 which converts the rotary motion of a drive shaft 480 to a rotary motion of the drive screw. The drive shaft 480 is mounted for rotation on the brackets 426 and extends between the brackets and outwardly from one bracket to mount a drive gear 482. The drive gear 482 is designed to mesh with a drive gear 484 when the foot rest assembly 464 is pivoted to the rearward extent provided by the groove or slot 448 in the guide bracket 450 as shown in FIG. 17. When pivoted to the rearmost position, the spring units 446 are substantially vertical, and the foot pads 456 in their lowermost position are substantially parallel to the support surface for the wheelchair. Now, the handwheels 246 for the wheelchair can be rotated to rotate drive pulleys 486 which, by means of belts 488, rotate drive pulleys 490 connected to the drive gear 484. This in turn will rotate the drive pulley 482, the drive shaft 480 and the drive screw 470 which will extend to lower the foot pads 456 against the support surface for the wheelchair. As the drive screw extends, the pistons for the spring units 466 will also extend compressing an internal spring or increasing the pressure of a gaseous medium within the spring cylinder. When the foot pads 456 are flush against the floor with the wheelchair seat assembly in the uppermost position, a geriatric patient may now back onto the foot pads and reverse the rotation of the handwheels 246. This will cause the drive screw 470 and the spring units 466 to raise the geriatric patient in a standing position until the buttocks of the patient engage and can be supported by the rear seat section 300 of the wheelchair seat. Now the handwheel drive to the pulley 486 can be disconnected by a suitable transmission mechanism connected to the clutch control lever 402, and the clutch control lever can be activated to engage the drive pulleys 410 with the handwheels, and the drive screw 376 can be activated to lower the seat assembly to a sitting position. It is obvious that the drive pulleys 486 and 490 and the belt 488 can be replaced by drive sprockets and an interconnecting chain or by a suitable direct gearing unit. The footrest drive mechanism shown in FIGS. 17 and 18 will normally be connected to both handwheels, although only one handwheel connection is shown.

Figure 19:
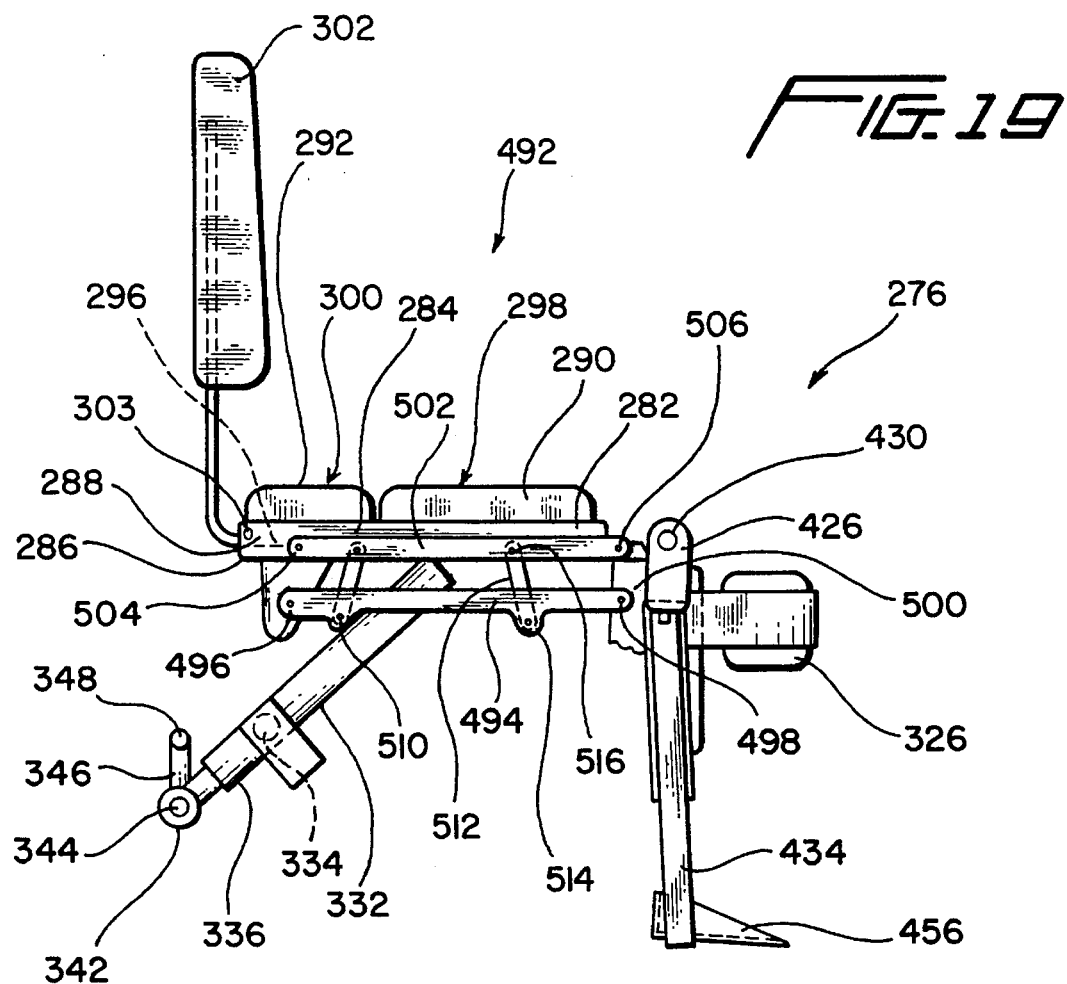
FIG. 19 is a view in side elevation of a second embodiment of a seat unit for the wheelchair of the present invention.
Figure 20:
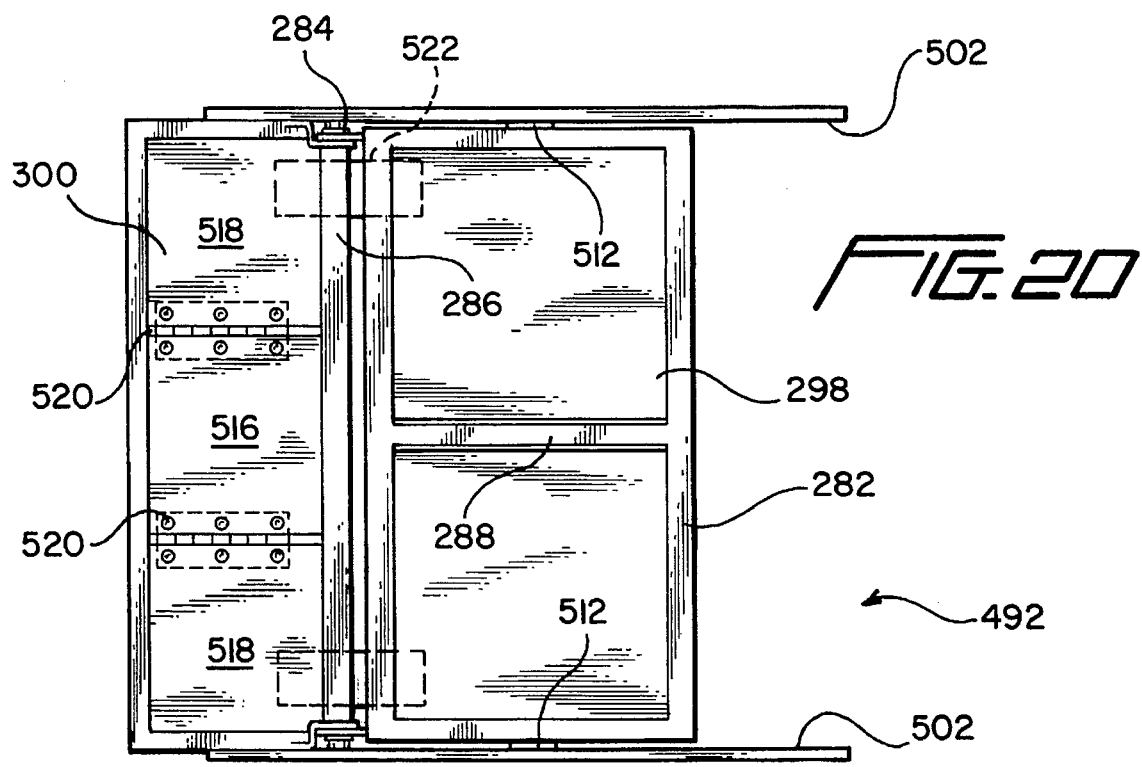
FIG. 20 is a plan view of a portion of the seat unit of FIG. 19.

It will be noted with reference to FIG. 10 that when the seat assembly 276 is driven upwardly to place the patient in a standing position, the seat cushion of the front section 294, sometimes tends to project outwardly into tight engagement with the patient's legs which are restrained in leg retainers 326 mounted on a foot assembly. In such instances, where a patient is in a standing position for long periods of time, the seat cushion tends to inhibit or cutoff circulation, and therefore, it is desirable for the front end of the seat cushion to be spaced beneath any possible line of contact with the patient's legs when the legs are retained. To accomplish this, a modified seat assembly 492 is shown in FIGS. 19 and 20. In the seat assembly 492, an elongated lower link 494 has one end pivoted at 496 to the rearward seat section 300 and a front end thereof is pivoted at 498 to a bracket 500 secured to a side frame 204 or 206. A second elongated link 502 is spaced above the first elongated link 494 and includes a first end pivoted at 504 to the rear seat section 300 and a second end pivoted at 506 to the bracket 500. Extending between the first and second elongated links 494 and 502 is a first connecting link 508 having an upper end which is pivoted to the pivot 284 and a lower end which is pivoted at 510 to the first elongated link 494. The first connecting link 508 is positioned in the area of the rear seat section 300, and a second connecting link 512 is positioned substantially centrally of the front seat section 298. The second connecting link 512 has a first end pivoted at 514 to the first elongated lower link 494, and a second end pivoted at 516 directly to the side of the front frame section 282. As will be noted in FIG. 20, the elongated links 494 and 502 with the connecting links 508 and 512 are formed on both sides of the seat assembly 492.

In operation, when the seat assembly 492 is raised by either the pump, cylinder and piston assembly 336 or the threaded drive screw 376, the elongated links 494 and 502 will pivot about the pivots 496, 498, 504 and 506. The rear ends of the elongated links 494 and 502 are raised upwardly with the rear section 300 of the seat and this will cause the second connecting link 512 to draw the frame 282 for the front seat section 298 downwardly and rearwardly about the pivot 284 as the seat assembly rises. This assures that the seat cushion 290 is drawn below a line formed by a patient's legs when the patient is supported in a standing position by the rear seat section 300 with the patient's legs confined in the leg retainers 326.

It will be noted that the rear section 300 of the seat assembly 492 includes a central bottom panel 516 fixed to the frame 286. Two side bottom panels 518 are hinged at 520 to the central bottom panel 516 to support the cushion 292. Two lifters 522 (shown in broken lines in FIG. 20) secured to the underside of the rear portion of the front seat section 298 engage and raise the side bottom panels 518 about the hinges 520 when the front seat section pivots downwardly.

INDUSTRIAL APPLICABILITY

The wheelchair of the present invention permits a patient to manually rotate handwheels which operate a drive mechanism to selectively propel the wheelchair, raise and lower the wheelchair seat between a standing and a sitting position or to raise the footrest for the wheelchair to elevate a patient onto a portion of a wheelchair support seat in the standing position.

I claim:

1. A wheelchair for transporting an occupant over a support surface comprising:
   a structural frame;
   wheelchair support wheels mounted for rotation on said structural frame for engaging said support surface;
   a wheel drive means mounted upon said structural frame and connected to drive at least one of said wheelchair support wheels,
   seat means mounted upon said structural frame;
   a foot support assembly pivotably mounted on said structural frame below said seat means, said foot support assembly including a footpad support structure, elongate footpads mounted on said footpad support structure for supporting the feet of an occupant, and manually operable footpad drive means connected to said footpad support structure for raising and lowering said footpad support structure in a straight line path of travel between said support surface and said seat means to raise or lower an occupant standing on said elongate footpads, said footpad drive means operating to lower said footpad support structure to a lowermost position with said elongate footpads adjacent to said support surface and to an uppermost position above said lowermost position,
   a manually rotatable handwheel mounted upon said structural frame;
   transmission means mounted on said structural frame and connected between said handwheel and said footpad drive means, said transmission means operating in response to rotation of said handwheel to cause said footpad drive means to raise or lower said footpad support structure;
   and shift control means mounted upon said frame and operable to selectively and individually connect said handwheel to said wheel drive means or said transmission means.

2. The wheelchair of claim 1 wherein said seat means includes a seat, seat drive means mounted on said structural frame to engage said seat, said seat drive means operating to drive said seat relative to said structural frame between a lowermost position relative to said wheelchair support wheels and an uppermost position spaced above said lowermost position, said seat being articulated and including a rear seat section and front seat section pivotally connected to said rear seat section and seat support means connected between said seat and said structural frame and operative to cause said front seat section to extend outwardly in substantially the same plane as the rear seat section when said seat is in the lowermost position while causing the front seat section to pivot downwardly from the rear seat section when said seat is moved to the uppermost position.

3. The wheelchair of claim 2 wherein said shift control means is operable to selectively and individually connect said handwheel to said wheel drive means, said seat drive means or said transmission means connected to said footpad drive means.

4. A wheelchair for transporting an occupant over a support surface comprising:
   a structural frame;
   wheelchair support wheels mounted for rotation on said structural frame for engaging said support surface;
   seat means mounted upon said structural frame;
   a foot support assembly pivotably mounted on said structural frame below said seat means to pivot from a first position substantially perpendicular to said support surface to at least one position above said first position where said foot support assembly extends angularly outwardly from said frame, said foot support assembly including a footpad support structure, elongate footpads mounted on said footpad support structure for supporting the feet of an occupant, and manually operable footpad drive means connected to said footpad support structure for raising and lowering said footpad support structure in a straight line path of travel extending in a direction between said support surface and said seat means to raise or lower an occupant standing on said elongate footpads, said footpad drive means operating to lower said footpad support structure to a lowermost position with said elongate footpads adjacent to said support surface and to an uppermost position above said lowermost position, a manually rotatable handwheel mounted upon said structural frame and transmission means mounted on said structural frame and connected between said handwheel and said footpad drive means, said transmission means operating in response to rotation of said handwheel to cause said footpad drive means to raise or lower said footpad support structure.

5. The wheelchair of claim 4 wherein said seat means includes a seat, seat drive means mounted on said structural frame to engage said seat, said seat drive means operating to drive said seat relative to said structural frame between a lowermost position relative to said wheelchair support wheels and an uppermost position spaced above said lowermost position, said seat being articulated and including a rear seat section and front seat section pivotally connected to said rear seat section and seat support means connected between said seat and said structural frame and operative to cause said front seat section to extend outwardly in substantially the same plane as the rear seat section when said seat is in the lowermost position while causing the front seat section to pivot downwardly from the rear seat section when said seat is moved to the uppermost position.

6. The wheelchair of claim 4 wherein a wheel drive means is mounted upon said structural frame and is connected to drive at least one of said wheelchair support wheels, and shift control means are mounted upon said frame and operable to selectively and individually connect said handwheel to said wheel drive means or said transmission means.

7. The wheelchair of claim 4 wherein said foot support assembly includes a bracket assembly pivoted to said structural frame, said footpad drive means including a drive screw means including a threaded drive screw connected to said footpad support structure, a rotatable drive shaft mounted for rotation on said bracket assembly, and footpad transmission means mounted between said drive shaft and said drive screw means, said footpad transmission means operating to transmit rotation of said drive shaft to said drive screw.

8. A wheelchair for transporting an occupant over a support surface comprising:

a structural frame;

wheelchair support wheels mounted for rotation on said structural frame for engaging said support surface;

an occupant supporting seat mounted upon said structural frame;

a footpad support structure for supporting the feet of an occupant, and a foot support assembly pivotally mounted on said structural frame for selectively moving said footpad support structure either pivotally or in a straight line path relative to said structural frame, said foot support assembly including footpad drive means connected to said footpad support structure for raising and lowering said footpad support structure in a straight line path of travel extending in a direction between said support surface and said seat to raise or lower an occupant standing on said footpad support structure, said footpad drive means operating to lower said footpad support structure to a lowermost position adjacent to said support surface and to an uppermost position spaced above said lowermost position.

9. The wheelchair of claim 8 wherein said foot support assembly is mounted for pivotal movement relative to said frame between a first position where said foot support assembly is substantially perpendicular to said support surface to at least one position above said first position where said foot support assembly is angled outwardly from said frame, said footpad drive means being operable to drive said footpad support structure between said lowermost and uppermost positions only in the first position of said foot support assembly.

10. The wheelchair of claim 8 which includes seat drive means mounted on said frame to drive said occupant supporting seat for movement relative to said frame between a lowermost position relative to said wheels and an uppermost position spaced above said lowermost position.

11. The wheelchair of claim 8 wherein a manually operated power means is mounted on said structural frame, said manually operated power means operating to provide power to said footpad drive means.

12. The wheelchair of claim 11 wherein said manually operated power means operates to provide power to said seat drive means.

13. The wheelchair of claim 11 which includes a wheel drive means mounted upon said structural frame to drive at least one of said wheelchair support wheels, said manually operated power means operating to provide power to said wheel drive means.

14. The wheelchair of claim 13 wherein said manually operated power means operates to provide power to said seat drive means.

15. The wheelchair of claim 8 which includes seat drive means mounted on said frame to drive said occupant supporting seat for movement relative to said frame between a lowermost position relative to said wheels and an uppermost position spaced above said lowermost position, said occupant supporting seat being articulated and including a rear seat section and a front seat section pivoted to said rear seat section, said front seat section of said occupant supporting seat extending outwardly in a plane of said rear seat section in the lowermost position of said occupant supporting seat, the front seat section of said occupant supporting seat pivoting downwardly from said rear seat section as said occupant supporting seat moves from the lowermost to the uppermost position, and pivoted linkage means connected to said structural frame and said occupant supporting seat, said linkage means including a link connected to the front seat section of said occupant supporting seat and operating to draw the front seat section of said occupant supporting seat rearwardly of said wheelchair as said front seat section pivots downwardly from said rear seat section.

* * * * *